Dec. 22, 1970     O. C. WAGNER     3,549,422

RECHARGEABLE METAL-AIR BATTERY

Filed Dec. 2, 1968

INVENTOR,
OTTO C. WAGNER.

BY: Roy E. Gordon   AGENT
Harry M. Saragovitz,
Edward J. Kelly &
Herbert Berl    ATTORNEYS United States Patent Office 3,549,422
Patented Dec. 22, 1970

3,549,422
RECHARGEABLE METAL-AIR BATTERY
Otto C. Wagner, Long Branch, N.J., assignor to the United States of America as represented by the Secretary of the Army
Filed Dec. 2, 1968, Ser. No. 780,496
Int. Cl. H01m 27/00
U.S. Cl. 136—86           3 Claims

ABSTRACT OF THE DISCLOSURE

A rechargeable metal-air unit cell is provided in which a flat cadmium anode is positioned intermediate of and spaced from a pair of flat air cathodes and means provided to transport the electrolyte to the electrodes. The electrolyte transport means include an electrolyte reservoir adjoining the electrodes, each cell being in combination with an electrode separation system consisting of electrolyte absorbent material layers extending from the cathode and anode faces respectively into the reservoir with layers of nonoxidizable membrane material positioned between the layers of electrolyte absorbent material.

---

The invention described herein may be manufactured, used, and licensed by or for the Government for governmental purposes without the payment to me of any royalty thereon.

BACKGROUND OF THE INVENTION

This invention relates in general to rechargeable metal-air batteries and in particular to a rechargeable cadmium-air unit cell.

Alkaline cadmium batteries as exemplified by the nickel-cadmium and silver-cadmium batteries are known in the art. One of the problems of metal-air batteries is polarization due to loss of water on cycling. A major problem with alkaline cadmium batteries is the loss of capacity that occurs as a result of cadmium recrystallization and densification during the course of cycling. Deep discharging, low rates of charge and discharge and carbonate buildup in the electrolyte accelerate the capacity loss.

SUMMARY OF THE INVENTION

The general object of this invention is to provide a rechargeable cadmium-air unit cell in which the aforementioned problems are overcome. A more particular object of this invention is to provide such a cell that will have a high energy density, a long cycle life, a minimum of maintenance requirements, excellent cell balance and a maximum utilization of active material throughout the useful life of the cell.

According to the invention, a rechargeable cadmium-air unit cell is provided that meets the above stated objectives. The cell comprises a flat sponge cadmium anode positioned intermediate of and spaced from a pair of flat air cathodes. Means are included to provide electrolyte for the electrodes. These include an electrolyte reservoir in the cells in combination with an electrode separation system consisting of electrolyte absorbent material layers extending from the cathode and anode faces respectively into the reservoir with layers of nonoxidizable membrane material positioned between the layers of electrolyte absorbent material.

BRIEF DESCRIPTION OF THE DRAWINGS

The invention can best be understood by referr;ing to FIGS. 1A, 1B and 2 of the drawing wherein.

DESCRIPTION OF THE PREFERRED EMBODIMENT

Figure 1A:
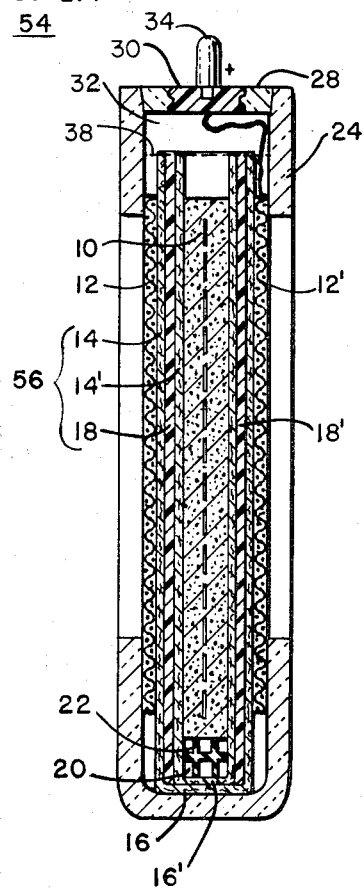
FIG. 1A is a section taken along the line A—A of FIG. 1B.
Figure 1B:
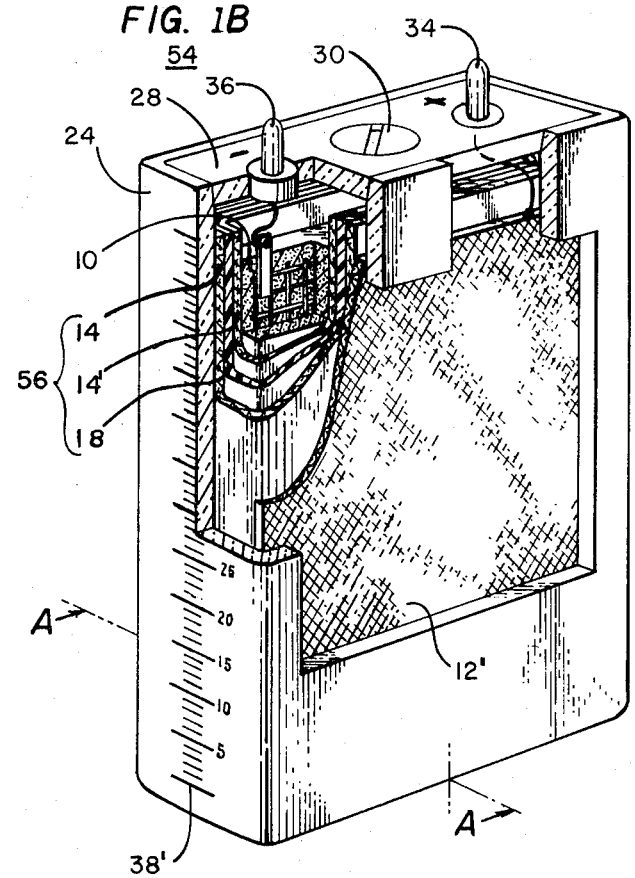
FIG. 1B is a cutaway view in perspective of a rectangular shaped unit cadmium-air cell.

Referring now to FIGS. 1A and 1B, at 10 there is shown a flat sponge cadmium anode positioned intermediate and spaced from a pair of flat planar air cathodes 12 and 12'. The electrode separation system includes a first.U-shaped layer 14 of electrolyte absorbent material having its arms in contact with the respective cathodes 12 and 12' with the base 16 thereof extending beyond the ends of the cathodes 12 and 12' and spaced from the lower end of the anode 10. A second U-shaped layer 14' of electrolyte absorbent material is spaced from the first U-shaped layer 14 and arranged such that its arms are in contact with anode 10 and its base 16' is superimposed on the first layer base 16 and also spaced from the lower end of the anode 10. Layer 18 of non-oxidizable membrane material fills the spaces between both electrolyte absorbent layers 14 and 14', as shown. The two electrolyte absorbent layers 14 and 14' are made of the same material, as for example, polyamide and polypropylene nonwoven felts. The spacing between the lower end of anode 10 and the base of the second layer 16' of electrolyte absorbent material 14' is filled with alkaline electrolyte to form a reservoir 20. To properly position the anode 10 above the reservoir 20, a plastic spacer 22 is situated in the reservoir region. Since electrolyte from the reservoir 20 is to some extent forced up to a level 38 above the electrodes 10, 12 and 12' respectively, sufficient head space 32 must be provided to extend the reservoir above the electrodes. A cell case frame 24 is provided for the cell as shown. When sealed in such a manner, the frame 24 extends over a minimum of the pores of the air cathodes 12 and 12' at the cathode-air interface. A filling hole 30 is provided in the upper part of frame 24. Head space 32 is provided between the anode 10 and the top part of frame 24. Suitable terminals for both the air cathode and the anode are provided as at 34 and 36 with the cathodes 12 and 12' being connected in common to the terminal 34 which is the positive terminal of the cell. In addition, the frame 24 is made of transparent or translucent plastic and electrolyte level indicating marks 38 (FIG. 1B) located thereon to a level above the electrodes. When the electrolyte level drops below the "safe" level, water can be added to the cell through fill hole 30. With the arrangement as shown above, the wicking action to transport electrolyte to the cell electrodes is provided by the electrolyte absorbent layers 14 and 14'.

Figure 2:
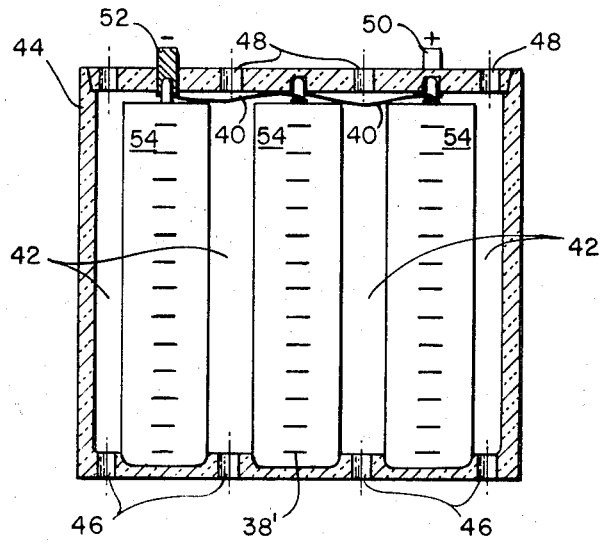
FIG. 2 is a section of a battery consisting of several stacked cadmium-air unit cells.

Referring to FIG. 2, a battery consisting of a stack of unit cadmium-air cells are electrically connected as shown by intercell connectors 40 and separated by air spacers 42 to provide continuous air flow to the air electrodes 12 and 12'. The cadmium-air stack is contained within a battery case 44 in which inlet air ports 46 and outlet air ports 48 are provided between each unit cell. The electrical circuit is completed by the use of conventional battery terminal posts 50 and 52. As was described in FIGS. 1A and 1B, each unit cadmium-air cell 54 will include an active sponge cadmium anode 10, the composite electrode system described in FIG. 1 and electrolyte reservoir 20.

As noted above, a sponge cadmium electrode is used as the anode. The advantage of a sponge cadmium electrode over a supported one is that its initial energy density is considerably higher by virtue of the fact that it does not contain heavy and bulky inactive support material. As the sponge electrode loses capacity at a faster rate by recrystallization than the supported electrode, it is desirable to provide the sponge cadmium electrode with an effective extender. As the extender, one may use a metal oxide that is electromechanically inert, insoluble in alkali, and that possess crystal lattice parameters similar to that of cadmium hydroxide. Examples of suitable extenders are magnesium hydroxide, manganese dioxide, barium hydroxide, calcium hydroxide, cobalt hydroxide, nickel hydroxide, ferric oxide, lead oxide, magnesium oxide, molybdenum hydroxide, the platinum group of oxides or hydroxides, the rare earth oxides, stannic oxide, vanadium oxide, vanadium pentoxide, tungstic oxide, and zirconium oxide. Particularly preferred extenders are alpha ferric oxide ($Fe_2O_3$) or hematite, or jewelers rouge and titanium dioxide. It has been found for example, that a sponge cadmium anode containing either 5 percent by weight $F_2O_3$ or 5 percent by weight titanium dioxide loses none of its initial capacity in 30 cycles as compared to a 40 percent loss for a control electrode (without $Fe_2O_3$) in 12 cycles. The extended sponge electrode can be conveniently prepared by admixing 0.1 to 30 percent by weight of the $Fe_2O_3$ or $TiO_2$ with active cadmium oxide (CdO), 1 to 10 percent by weight of a conductive material such as nickel or silver or carbon powder, and 0.1 to 1 percent by weight of a suitable binder such as polyvinyl alcohol or Teflon. After mixing the additive with the cadmium oxide into a homogeneous blend, an electrode is prepared by mold pressing the mix with screen-type or expanded mesh grid to a proper powder density of about 1.5 to 3.5 grams cadmium per cc. Another method of preparing the electrode is to coprecipitate about 0.1 to 30 percent by weight of $Fe(OH)_2$ by adding alkali to the nitrate or chloride solution of $Cd^{++}$ and $Fe^{+++}$. After filtering, washing and drying, a mold pressed cadmium electrode results. The optimum range of particle size for the $Fe_2O_3$ is 0.01 to 10 microns; preferably 0.5 to 1 micron. The particle size range of the cadmium oxide should be 0.01 to 5 microns; preferably 0.5 to 1 micron. The thickness of the sponge cadmium anode is not critical.

As the air cathodes 12 and 12', any of the conventional air cathodes can be used as are presently used in fuel cell batteries. The air cathode used in bifunctional; that is. it charges and discharges. Its structure generally consists of a film of platinum and Teflon on which lies a conducting screen such as nickel or stainless steel over which lies a porous Teflon film which is exposed to the ambient air. The air cathode is about 10 mils in thickness.

The electrolyte reservoir 20 is provided in the unit cell to overcome water loss. In addition, a sufficient quantity of insoluble $Ba(OH)_2$ or $Ca(OH)_2$ in the order of 2 milligrams per ampere-hour per cycle for $Ba(OH)_2$ and 1 milligram per ampere-hour per cycle for $Ca(OH)_2$ can be added to the base of the cell to remove carbonate ions and thereby prevent less of capacity by the metal anode and premature shorting of the battery cells. If carbonate is not removed from the cadmium-air battery, the unit cells will lose up to 35 percent of their initial capacity in 35 cycles. With the addition of the proper amount of $Ba(OH)_2$ and $Ca(OH)_2$ to the reservoir, the capacity loss will be less than 3 percent in the same number of cycles with the cadmium anode containing 10 percent alpha $Fe_2O_3$ extender. In this connection, the optimum concentration of the KOH electrolyte in a conventional alkaline metal-air cell is 10 to 50 percent by weight. Normally, 30 percent is employed. To prevent the concentration from exceeding 35 percent in the reservoir-type metal-air cell during cycling, more dilute electrolyte must be initially employed. The proper initial concentration is about 30 percent of KOH. This is the amount required to fill the pores of the anode (plus separator) plus a quantity of water required to fill the reservoir.

The electrolyte absorbent material layers 14 and 14' provide the wick means to wet the electrodes. Examples of suitable materials are polyamide and polypropylene nonwoven felts, pigmentary potassium titanate (with Teflon or polyphenylene oxide binder), and ceric oxide matrices, etc. The material may be conveniently joined to the electrodes by heat sealing the edges about the anode 10. The electrolyte absorbent material layer(s) is about 2 to 10 mils in thickness.

The nonoxidizable and nondegradeable membrane material layers 18 and 18' positioned between the electrolyte absorbent layers must stop any migration of anode and cathode material and oxygen. Examples of membrane materials that can be used include alumina-silicate ceramic or zirconium phosphate (with Teflon or polyphenylene oxide binder) cellulosics such as cellophane and visking, polyvinyl alcohol film and carboxylic grafted polyethylene. The thickness of each membrane layer is about 1 to 8 mils.

The cadmium-air batteries of the invention have a cycle life of one thousand or more cycles. Furthermore, they can be constructed to an energy density of 45 to 50 watt-hours per pound.

Various modifications are seen as coming within the scope of the invention. For example, other relatively insoluble anode materials can be used for the rechargeable metal-air cell, such as, iron or lead. Then too, instead of a flat configuration as shown in FIGS. 1 and 2, cylindrical and spiral cell configurations can be used.

The cylindrical unit cells can be stacked side by side with proper air space separation or can be stacked one on top of the other into a cylindrical battery configuration. The spaced configuration consisting of a spirally wound sandwich of separator clad anode, bifunctional air electrodes, and air spacers, results in a high capacity compact unit cell which can be stacked into a battery case in the same manner as with the cylindrical cells.

The electrolyte reservoir can be located on the sides of the electrodes as well as the top and/or bottom. The preferred embodiment is to locate the reservoir on top of the electrodes.

The use of alpha ferric oxide extender in the alkaline cadmium anode is applicable for all alkaline cadmium batteries, such as nickel-cadmium and silver-cadmium batteries.

The foregoing description is to be considered merely as illustrative of the invention and not in limitation thereof.

What is claimed is:

1. A rechargeable cadmium-air electrical cell comprising:
   a pair of flat planar air cathodes,
   a flat sponge anode consisting essentially of cadmium and 0.1 to 30 percent by weight of alpha ferric oxide or titanium dioxide positioned intermediate said air cathodes, and spaced therefrom, and
   means to provide electrolyte for said electrodes, said means including an electrolyte reservoir containing an aqueous solution of 10–50 percent by weight of potassium hydroxide and a compound selected from the group consisting of barium hydroxide and calcium hydroxide in an amount sufficient to remove carbonate ions, for the cell, said reservoir adjoining said anode and cathodes and an electrode separation system comprising spaced layers of electrolyte absorbent material intermediate said cathode and anode and wetted by the electrolyte in said reservoir to provide wicking action for the electrodes and a layer of nonoxidizable membrane material positioned between and in contact with said electrolyte absorbent material layers.

2. A rechargeable cadmium-air electrical cell according to claim 1 wherein the electrolyte absorbent material is selected from the group consisting of polyamide and polypropylene nonwoven felts, and pigmentary potassium titanate and ceric oxide matrices.

3. A rechargeable cadmium-air electrical cell according to claim 1 wherein the nonoxidizable membrane material is selected from the group consisting of alumina-silicate ceramic, zirconium phosphate, cellophane, polyvinyl alcohol film and carboxylic grafted polyethylene.

References Cited
UNITED STATES PATENTS

| | | | |
|---|---|---|---|
| 3,333,986 | 8/1967 | Chreitzberg et al. | 136—6 |
| 3,347,707 | 10/1967 | Southworth | 136—6 |
| 3,462,304 | 8/1969 | Scholzel | 136—6 |
| 3,476,601 | 11/1969 | Berger et al. | 136—6 |

WINSTON A. DOUGLAS, Primary Examiner

H. A. FEELEY, Assistant Examiner